3,278,386
DELAY BED SYSTEM FOR PURIFICATION OF NUCLEAR FUEL ELEMENT PURGE STREAM
James E. French, Escondido, and Keith G. Steyer and George L. Wessman, San Diego, Calif., assignors, by mesne assignments, to the United States of America as represented by the United States Atomic Energy Commission
Filed Aug. 14, 1964, Ser. No. 390,280
5 Claims. (Cl. 176—37)

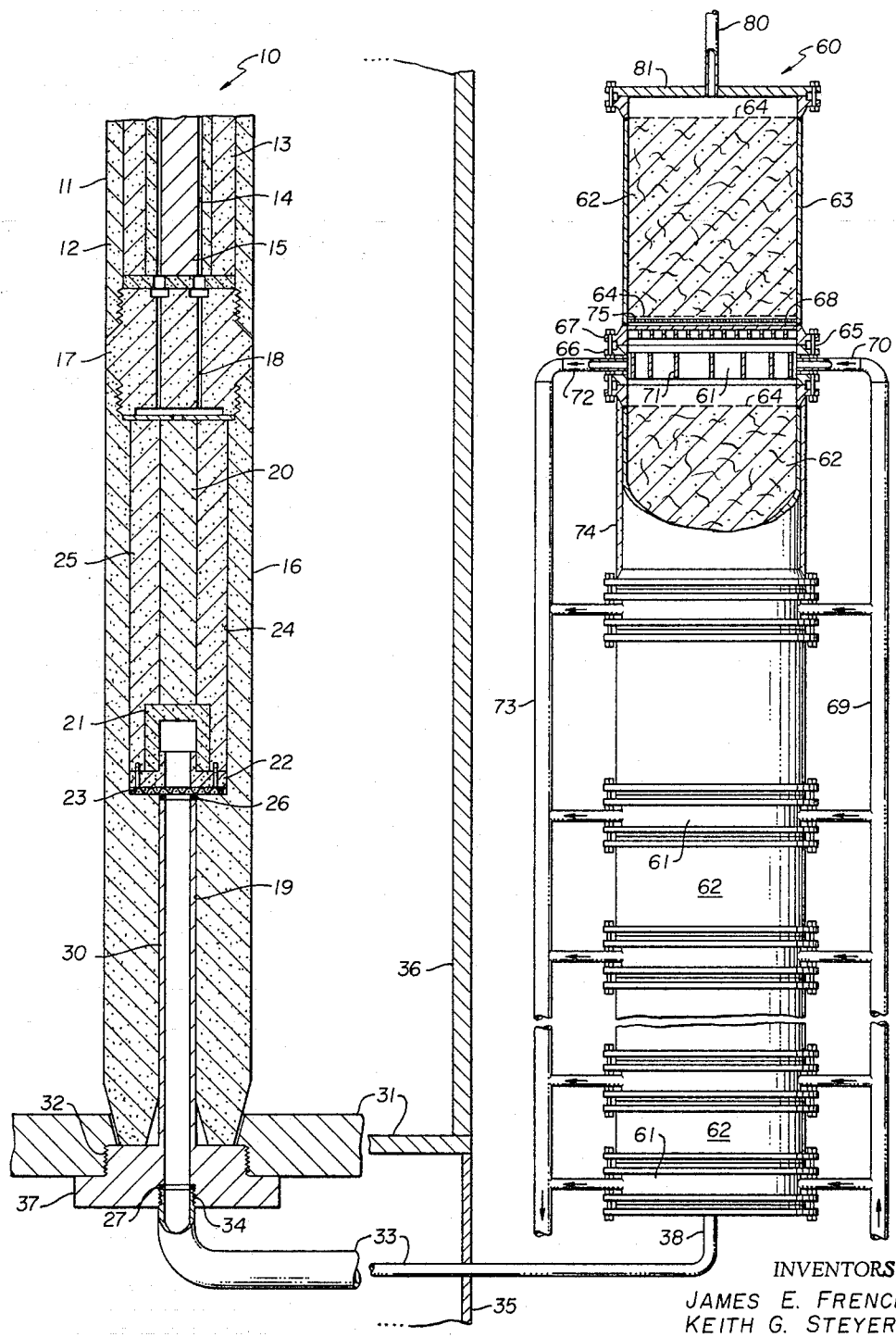

The invention described herein was made in the course of, or under, Contract AT(04–3)–167, Project Agreement No. 17, with the United States Atomic Energy Commission.

This invention relates to nuclear reactors, and more particularly to a system for maintaining the relative purity of the coolant system thereof.

In the operation of a nuclear reactor a large variety of products are produced by the fission process. Most of these fission products are radioactive isotopes. In high temperature gas cooled reactors operating in the thermal energy range some of the gaseous isotopes produced are either readily condensible themselves or are short-lived isotopes which produce long-lived daughters that are readily condensible. In this regard, fission product isotope $Xe^{137}$ with a half-life of 3.8 minutes with plate-out daughters $Cs^{137}$ and $Ba^{137m}$ is of particular concern.

Although fuel elements for reactors are ordinarily designed to retain the fission products produced, many of these products are extremely difficult to retain, and consequently there is always some escape. Moreover, since retention of the fission products in the fuel elements retains materials of high neutron cross section in the core where they will compete with the fuel material for neutrons, a great deal of attention has been given to releasing type fuel elements which are designed to release rather than retain the volatile fission productions. In the absence of provisions for purging these products from the fuel elements, they are picked up by the coolant and are circulated therewith.

Accordingly, in view of the radioactive nature of the fission products, and the propensity of many of them to condense or plate-out in reactor areas such as coolant passages where they would interfere with efficient operation of the reactor, a system providing for the removal of these fission products from the fuel elements and controlled removal of them from the core area is necessary in the case of the plate-out isotopes. The necessity of such a system is, of course, even more compelling in the case of releasing-type fuels.

When the great number of isotopes produced by the fissioning process with the attendant great diversity in properties is considered, the magnitude of the problem of removing these isotopes can be appreciated. Many of these isotopes undergo radioactive decay, and when considered in the aggregate significant quantities of heat are produced by the decay of isotopes in the purge stream. The length of time involved in the decay process—measured in terms of half-life of the isotope—varies with each isotope, and therefore the coolant purification system must be designed to accommodate these individual differences—or at least to effect a compromise with respect to them—and would advantageously be designed to remove for useful purposes the significant quantities of heat produced through radioactive decay.

Another consideration of considerable significance is that the competition for space around a reactor core is extremely keen, and therefore, the coolant purification system must accomplish its function in as small a space as possible.

Accordingly, it is an object of the present invention to provide an apparatus and process for substantially purifying a fuel element purge stream of a gas cooled reactor.

Another object of this invention is to provide an apparatus and method for removing fission product isotopes with plate-out tendencies from a fuel element purge stream.

An additional object of this invention is to provide an apparatus and a method for delaying at least a portion of the radioactive isotopes in a fuel element purge stream and removing at least a portion of the heat produced by decay of these radioactive fission products.

A still further object of the invention is to provide a coolant purification system for a gas-cooled nuclear reactor that will substantially purify a purge stream while consuming a relatively small amount of space.

Various other objects and advantages will appear from the following description of a preferred embodiment of the invention, and the most novel features will be particularly pointed out hereinafter in connection with the appended claims.

In a broad sense, the invention contemplates the removal of a substantial portion of the volatile radioactive fission products from a purge stream by passing the stream through a means that will delay at least a portion of the radioactive isotopes therein a sufficient time to allow significant radioactive decay of them. In a somewhat narrower sense, the invention provides for delay of the radioactive isotopes of a purge stream in a delay bed by their continued adsorption and desorption as the stream traverses a permeable substance in the delay bed having high adsorption characteristics with respect to components of the fission product constituents of the stream. The invention further proposes making the process of delaying the fission products highly efficient by controlling the temperatures of the purge stream and the adsorbent substance in the bed. A specific means for accomplishing this temperature control is a series of heat exchangers and adsorbent portions with the quantity of the adsorbent material in the adsorbent portions being such that the heat produced by decay in the individual adsorbent portion does not raise the temperature of the stream beyond a temperature where the effectiveness of the adsorption process is curtailed, and the cooling capacity of each heat exchanger being sufficient to remove a sufficient quantity of the heat added to the stream through the decay process prior to entry of the stream into a subsequent adsorbent portion to enable effective adsorption to take place in the subsequent portion. With the use of activated charcoal which is the preferred adsorbent substance, the adsorbent portion should be terminated and the stream cooled before the temperature of 450° F. is reached and the stream should be cooled to lower than 200° before entry into a subsequent adsorbent portion. Of course the lower the temperature to which the stream is cooled, the higher the efficiency of the subsequent adsorbent portion. This temperature, however, is governed by practical considerations regarding the particular heat exchange fluid employed, i.e., in the case of water, about 40° F. would be the practical low temperature due to potential freezing in the lines, and temperatures of 200° F. would be satisfactory for some applications. With heat exchange fluids such as Freon, however, much lower temperatures could be used with the attendant increase in the efficiency of the adsorption process—but at the cost of a more complex system overall.

Of the five krypton and seven xenon isotopes present in the purge stream in significant quantities, $Kr^{88}$, $Kr^{89}$, $Xe^{137}$ and $Xe^{138}$ are of considerable interest due to the plate-out characteristics of their daughter products. Of these $Xe^{137}$ is of primary significance in view of its very troublesome plate-out daughters $Cs^{137}$ and $Ba^{137m}$. Moreover, $Xe^{137}$ is the limiting factor in the design of a fission product delay bed with the goal of accomplishing decay of all the precursors of gamma emitting isotopes. Accordingly, the present invention provides a delay bed with the parameters selected to provide a total delay sufficient to enable substantially all the $Xe^{137}$ to decay to $Cs^{137}$ and $Ba^{137m}$. With this length of delay, the long-lived plate-out activity source in the purge stream will be reduced a sufficient degree to permit its return to the reactor coolant system.

Referring now to the drawing, the single drawing is a partially sectional elevational view of a preferred embodiment of the invention. An overall understanding of the drawing may be gained by realizing that fuel element 10, which is partially shown on the left hand side of the drawing, is one of many such fuel elements making up the core of a gas-cooled nuclear reactor positioned within heavy cylindrical containment wall 36, only a portion of which is shown. The delay bed 60 shown on the right hand side of the drawing and drawn to a much smaller scale than fuel element 10, is positioned exterior to the core and heavy containment wall 36 but within its own heavy-walled containment vessel (not shown). The delay bed 60 could be positioned exterior to the core but within the heavy containment wall. Fuel element 10 and delay bed 60 are connected together in fluid flow relationship by conduit 33 which passes through lower reactor wall 35. While the present invention is contemplated to be primarily useful for gas cooled reactors, it will be appreciated that various features of the invention will be applicable to other types of reactors. The HTGR (high temperature graphite moderated gas-cooled reactor) for which the present invention is particularly well adapted has been described in Nucleonics, vol. 18, No. 1, pp. 86–90, January 1960.

Only the lower portion of fuel element 10 has been shown in the drawing, and only those details essential to an understanding of the purge system of the present invention will be described herein. Fuel element 10, however, is identical to that described in full detail in copending application S.N. 384,564 filed July 20, 1964, entitled "Fuel Element," which is a continuation in part of now abandoned application S.N. 365,221 filed May 5, 1964, both of which are assigned to the assignee of the present application. The disclosure of these applications is incorporated herein.

As fully explained in the above-cited applications, coolant is induced to flow radially inwardly in the fuel bearing portion 11 of fuel element 10 through body 12 made of graphite of controlled permeability, and across nuclear fuel material 13 held by body 12 to central bore 14 extending longitudinally therewith. Central bore 14 serves as a passageway for the purge gas flow and houses central moderator 15. Bottom connector 16 is connected to fuel bearing portion 11 by coupling element 17 and houses high temperature fission trap 20. The purge stream containing the fission products picked up from fuel material 13, flows downwardly through passages 18 of coupling element 17 into and through fission product trap 20 and out of fuel element 10 through hollow support pin 30.

Also as explained in detail in the above-referenced applications, fission product trap 20 consists of a generally cylindrical body of graphite proportioned to fit within cavity 24 of bottom connector 16. A plurality of radially inwardly extending slots machined in the outer surface and extending the length of trap 20 are filled with charcoal 25. Cup-shaped filter 21 rests on graphite cover 22 and a stainless steel screen 23. Filter 21 is made of a material such as porous graphite having a porosity which prevents solid particles from being carried out of the fuel element 10 with the purge gas exit stream.

Support pin 30 is received in central hole 19 of bottom connector 16 and is fastened to coreplate 31 by suitable means such as screw threads 32. The purge stream passes through support pin 30 into conduit 33 which is connected to pin 30 by a suitable connection such as screw threads 34 on plug portion 37. Gaskets 26 and 27 are provided to reduce leakage of the stream. Although for simplicity of illustration, conduit 33 is shown connected directly to pin 30, it will be understood that the purge stream exited from a plurality of fuel elements could be discharged into a manifold which would in turn be connected to conduit 33. Another possible alternative that will be understood by those skilled in the art is to discharge the purge streams from all of the fuel elements into a common plenum and connecting the desired number of delay beds 60 to the plenum by appropriate conduit means.

The purge stream is carried by conduit 33 through wall 35 to delay bed 60 which may be conveniently located next to the core containment wall 36. Delay bed 60 comprises a series of separate contiguous heat exchangers 61 and adsorbent portions 62. Since each heat exchanger as well as each adsorbent portion is generally of similar construction with the only significant difference being in size, only one each of these elements has been broken away to show detail. Heat exchangers 61 are of the extended fin type similar in design to those used for automobile radiators. Adsorbent portions 62 are made up of a permeable substance having high xenon adsorption characteristics. Particles of activated charcoal made from coconut shells have been found to be highly suitable for this purpose. The charcoal particles are retained in cylindrical wall 63 by screens 64 positioned at each of the ends of adsorbent portions 62. Steel grating 68 positioned in the bottom of each adsorbent portion and secured to the cylindrical shell 63 supports the bottom screen and the charcoal. Perforated plate 75 maintains a small spacing between screen 64 and steel grating 68.

Water or other heat exchange fluid is supplied from a source (not shown) through supply conduit 69 through inlet conduits 70 into individual heat exchangers 61. The heat exchange fluid passes through heat exchanger 61 removing heat from the purge stream flowing across the heat exchanger surfaces 71. The heat exchange fluid then exits through outlet conduits 72 and return conduit 73 to a suitable means (not shown) for extracting heat energy therefrom. Insulation 74 may be added to improve the heat efficiency of delay bed 60.

The purge stream traverses the series of heat exchangers 61 and adsorbent portions 62 of delay bed 60 and exits through outlet conduit 80 in endplate 81 to be returned to the main coolant stream through appropriate circulating means such as the main coolant circulator (not shown).

Now that the various components of the apparatus for carrying out the invention have been identified and described, the flow of the purge stream will be followed in order that the process by which the purge stream is purified may be better understood. The portion of the coolant stream induced to flow across the nuclear fuel particles 13 of fuel element 10 removes a portion of the volatile fission products therefrom. This purge stream is then drawn through the charcoal particles 25 of fission product trap 20. A large portion of fission products such as iodine, bromine, tellurium, cesium, strontium, and barium are held in this trap. Decay of the radioactive isotopes held in trap 20 produces heat that is absorbed by the reactor coolant flowing across the outside surface of the fuel element and, therefore, makes up a portion of the total heat output of the reactor.

The major portion of the krypton and xenon pass through the trap and are transported exterior of the core area by conduit 33 to delay bed 60. The temperature of the purge stream as it enters first heat exchanger 61 through inlet conduit 38 is about 700° F., which is too high a temperature for effective adsorption of xenon from the purged stream.

As previously mentioned, since xenon is the most troublesome element with regard to the plate-out problems and is the limiting factor with regard to removal of precursors of gamma emitting isotopes, the delay bed parameters are chosen for most efficient removal of xenon, and these parameters results in satisfactory overall performance with regard to removing other deleterious components of the purge stream. Accordingly, it is the function of first heat exchanger 61 to reduce the temperature of the purge stream in order that effective adsorption of xenon will result.

The cooled purged stream then exits first heat exchanger 61 and enters first adsorbent portion 62. As the stream proceeds through the adsorbent permeable substance, 62, contained therein, the fission product components are delayed in their journey by continued adsorption and desorption on the surfaces of the adsorbent substance. As this process proceeds, the decay of radioactive isotopes takes place within the adsorbent portion. As $Xe^{137}$ decays, plate-out daughters $Cc^{137}$ and $Ba^{137m}$ plate-out on the adsorbent substance and undergo further decay. Of course, similar processes take place in the case of $Kr^{88}$, $Kr^{87}$, $Sr^{89}$ and $Xe^{138}$, for instance, which also produce plate-out daughters. The heat produced by the decay process raises the temperature of the purged stream and in turn the adsorbent substance. Therefore, as the stream proceeds up through the adsorbent portion, its temperature rises until a point is reached where effective adsorption of xenon is greatly curtailed. At this point, the first adsorption portion ends and the reheated purge stream enters the second heat exchanger 61.

In the second heat exchanger at least a portion of the heat added to the purged stream by radioactive decay taking place in the first adsorption portion is removed, and the stream is reduced to a temperature at which effective adsorption of xenon will again take place. The purge stream then enters the second adsorbent portion where the adsorption, desorption, plate-out and decay processes previously described for the first adsorption portion again take place. And again, as the stream proceeds through the second adsorption portion, the temperature of the stream is raised to the point where the reduced effectiveness of the xenon adsorption dictates termination of the adsorption portion and the cooling of the stream through another heat exchanger. The series of heat exchangers followed by contiguous adsorbent portions is then continued until the $Xe^{137}$ concentration is reduced to an acceptable figure.

It is to be noted that since the particular mix or combination of radioactive isotopes decaying within each adsorbent portion will be different, the temperature characteristics within each adsorbent may be different, and accordingly, lengths of the various portions will not be identical. As will be noted from the drawing, as a general proposition, the lengths of the adsorbent portions increase with distance from the inlet 38. The following example sets out the parameters used in a particular application of the purge stream purification system described above. This example should be understood to in no way limit the scope of the invention which is defined in the appended claims.

*Example*

Delay bed 60 is made up of seven heat exchangers and seven adsorption portions. The diameter of the cylindrical shell 63 is 30 inches. The lengths of the seven adsorption sections starting from the bottom are 1½, 1½, 2½, 2½, 4, 5 and 6 feet respectively. The heat exchangers are housed within 1 foot long sections with the amount of cooling surface varied in accordance with the required cooling capacity. The absorbent substance is activated charcoal made from coconut shells and identified as Barnebey-Cheney activated charcoal type 107 which has been activated with high temperature steam. The particles used in adsorbent portion 62 have a particle size designation of mesh size 6 x 10 Tyler, with distribution being 10% maximum on mesh 6, 85% on meshes 7 through 10, and 5% maximum through mesh 10. The bulk density of these charcoal particles is preferably 0.45 to 0.55 gram per ml. and may be acceptable in the range 0.40 to 0.60 gram per ml.

The temperature and heat data for a delay bed of the above characteristics with a helium flow rate of 517 lbs./hr., and entrance temperature at first heat exchanger 61 of 700° F., pressure of 450 p.s.i.a. and the specific activity set out in Table 1 is shown in Table 2. The delay effected by a delay bed having the specified characteristics is shown in Table 3. The calculated activity by isotope by adsorption section is set out in Table 4.

The figures and dimensions set out in this example, would be appropriate for a 1000 mw.(e) high temperature, helium cooled, thermal reactor where twelve delay beds 60 are used for purge stream purification.

It will be understood that various changes in the details, materials, steps and arrangement of parts which have been herein described and illustrated in order to explain the nature of the invention, may be made by those skilled in the art within the principle and scope of the invention as expressed in the appended claims.

TABLE 1
[Specific activity]

| | | | |
|---|---|---|---|
| $Kr^{83m}$ | 3,900 c./lb. He | $Xe^{131m}$ | 2.30 c./lb. He. |
| $Kr^{85m}$ | 5,300 c./lb. He | $Xe^{133m}$ | 12.0 c./lb. He. |
| $Kr^{85}$ | 0.140 c./lb. He | $Xe^{133}$ | 1,080 c./lb. He. |
| $Kr^{87}$ | 14,000 c./lb. He | $Xe^{135m}$ | 170,000 c./lb. He. |
| $Kr^{88}$ | 14,500 c./lb. He | $Xe^{135}$ | 10,000 c./lb. He. |
| $Kr^{89}$ | 45,500 c./lb. He | $Xe^{137}$ | 46,000 c./lb. He. |
| | | $Xe^{138}$ | 36,000 c./lb. He. |

TABLE 2
[Heat and/or temperature produced and/or extracted?]

| Section | Heat Generated, B.t.u./hr. | Heat Removed, B.t.u./hr. | Temp. In, ° F. | Temp. Out, ° F. |
|---|---|---|---|---|
| 1st Exchanger | | 3.72×10⁵ | 700 | 120 |
| 1st Adsorption | 1.63×10⁵ | | 120 | 371 |
| 2d Exchanger | | 1.43×10⁵ | 371 | 150 |
| 2d Adsorption | 1.32×10⁵ | | 150 | 352 |
| 3d Exchanger | | 1.32×10⁵ | 352 | 150 |
| 3d Adsorption | 1.44×10⁵ | | 150 | 373 |
| 4th Exchanger | | 1.44×10⁵ | 373 | 150 |
| 4th Adsorption | 1.30×10⁵ | | 150 | 351 |
| 5th Exchanger | | 1.30×10⁵ | 351 | 150 |
| 5th Adsorption | 1.40×10⁵ | | 150 | 365 |
| 6th Exchanger | | 1.40×10⁵ | 365 | 150 |
| 6th Adsorption | 1.33×10⁵ | | 150 | 356 |
| 7th Exchanger | | 1.33×10⁵ | 356 | 150 |
| 7th Adsorption | 1.23×10⁵ | | 150 | 342 |

TABLE 3
[Delay effected]

| Section | Krypton Delay (hrs.) | Xenon Delay (hrs.) |
|---|---|---|
| 1st | 0.0125 | 0.063 |
| 2d | 0.013 | 0.066 |
| 3d | 0.020 | 0.094 |
| 4th | 0.023 | 0.11 |
| 5th | 0.033 | 0.16 |
| 6th | 0.044 | 0.22 |
| 7th | 0.058 | 0.294 |
| Total | 0.200 | 1.01 |

TABLE 4
[Activity in each adsorption section (curies)]

| Isotope | Section Number | | | | | | |
|---|---|---|---|---|---|---|---|
| | 1 | 2 | 3 | 4 | 5 | 6 | 7 |
| $Kr^{83m}$ | 26,000 | 27,000 | 40,000 | 45,000 | 66,000 | 86,000 | 110,000 |
| $Kr^{85m}$ | 34,000 | 37,000 | 54,000 | 61,000 | 90,000 | 120,000 | 150,000 |
| $Kr^{85}$ | 0.93 | 0.99 | 1.5 | 1.7 | 2.5 | 3.3 | 4.3 |
| $Kr^{87}$ | 91,000 | 96,000 | 140,000 | 160,000 | 230,000 | 300,000 | 380,000 |
| $Kr^{88}$ | 94,000 | 100,000 | 150,000 | 170,000 | 240,000 | 320,000 | 410,000 |
| $Kr^{89}$ | 270,000 | 245,000 | 290,000 | 250,000 | 260,000 | 10,000 | 140,000 |
| $Rb^{88}$ | 94,000 | 100,000 | 150,000 | 170,000 | 240,000 | 320,000 | 410,000 |
| $Rb^{89}$ | 270,000 | 245,000 | 290,000 | 250,000 | 260,000 | 210,000 | 140,000 |
| $Sr^{89}$ | 270,000 | 245,000 | 290,000 | 250,000 | 260,000 | 210,000 | 140,000 |
| $Xe^{131m}$ | 74. | 77.0 | 110 | 130 | 190 | 250 | 340 |
| $Xe^{133m}$ | 380 | 400 | 560 | 670 | 960 | 1,300 | 1,750 |
| $Xe^{133}$ | 35,000 | 37,000 | 52,000 | 63,000 | 90,000 | 120,000 | 160,000 |
| $Xe^{135m}$ | 500,000 | 440,000 | 500,000 | 460,000 | 450,000 | 365,000 | 250,000 |
| $Xe^{135}$ | 330,000 | 340,000 | 480,000 | 570,000 | 810,000 | 1,100,000 | 1,400,000 |
| $Xe^{137}$ | 1,100,000 | 580,000 | 350,000 | 140,000 | 50,000 | 10,000 | 1,050 |
| $Xe^{138}$ | 1,100,000 | 960,000 | 1,100,000 | 1,050,000 | 1,100,000 | 920,000 | 680,000 |
| $Cs^{137}$ | 545,000 | 290,000 | 180,000 | 72,000 | 25,000 | 5,000 | 525 |
| $Cs^{138}$ | 1,100,000 | 960,000 | 1,100,000 | 1,050,000 | 1,100,000 | 920,000 | 680,000 |
| $Ba^{137m}$ | 545,000 | 290,000 | 180,000 | 72,000 | 25,000 | 5,000 | 525 |
| Totals | 6,400,000 | 5,000,000 | 5,400,000 | 4,800,000 | 5,300,000 | 5,200,000 | 5,100,000 |

What is claimed is:

1. A delay bed for removing fission products from a gaseous stream comprising a series of adsorbent portions and heat exchangers each adsorbent portion being preceded by and contiguous to a heat exchanger of sufficient capacity to cool said fission product laden gaseous stream to less than 200° F. prior to entry into said adsorbent portion, said adsorbent portion comprising a permeable substance of high xenon adsorption capacity, the quantity of said substance being such that the heat produced by decay of radioactive isotopes which are delayed by continued adsorption and desorption on said substance does not raise the temperature of said stream and said substance beyond 450° F., and the total number of said adsorbent portions being sufficient to delay the major portion of $Xe^{137}$ a sufficient time to decay to plate-out daughters $Cs^{137}$ and $Ba^{137m}$.

2. A delay bed for removing fission products from a gaseous stream comprising a plurality of adsorbent portions and heat exchangers each adsorbent portion being preceded by and contiguous to a heat exchanger of sufficient capacity to cool said gaseous stream to less than 200° F. prior to entry thereof into said contiguous adsorbent portion, said adsorbent portions comprising permeable activated charcoal having a bulk density of 0.40 to 0.60 gram per ml. and having high xenon adsorption capacity, the quantity of said charcoal being such that the heat produced by decay of radioactive isotopes which are delayed by continued adsorption and desorption on said charcoal does not raise the temperature of said stream and said charcoal over 450° F., the total number of said adsorbent portions being sufficient to delay the flow of xenon over .70 hour whereby the major portion of $Xe^{137}$ decays to isotopes $Cs^{137}$ and $Ba^{137m}$ which plate-out on said charcoal.

3. The delay bed of claim 2 wherein said permeable activated charcoal has a size distribution of 6 x 10 Tyler.

4. An apparatus for the removal of radioactive fission products from a fuel element purge stream of a nuclear reactor comprising a conduit connecting the purge stream exit of at least one fuel element with a delay bed positioned exterior of the reactor core portion, said delay bed comprising a plurality of adsorbent portions and heat exchangers each adsorbent portion being preceded by and contiguous to a heat exchanger of sufficient capacity to cool said gaseous stream to less than 200° F. prior to entry thereof into said contiguous adsorbent portion, said adsorbent portion comprising permeable activated charcoal having a bulk density of 0.40 to 0.60 gram per ml. and having high xenon adsorption capacity, the quantity of said charcoal being such that the heat produced by decay of radioactive isotopes which are delayed by continued adsorption and desorption on said charcoal does not raise the temperature of said stream and said charcoal over 450° F., the total number of said adsorbent portions being sufficient to delay the flow of xenon over .70 hour whereby the major portion of $Xe^{137}$ decays to isotopes $Cs^{137}$ and $Ba^{137m}$ which plate-out on said charcoal.

5. The delay bed of claim 4 wherein said permeable activated charcoal has a size distribution of 6 x 10 Tyler.

References Cited by the Examiner

UNITED STATES PATENTS

| | | | |
|---|---|---|---|
| 2,675,089 | 4/1954 | Kahle | 55—180 X |
| 2,851,409 | 9/1958 | Moore | 176—37 |
| 3,010,889 | 11/1961 | Fortescue et al. | 176—37 X |
| 3,039,948 | 6/1962 | Krucoff | 176—37 |
| 3,054,738 | 9/1962 | Hermans et al. | 176—37 |
| 3,080,307 | 3/1963 | Rinald | 23—252 |
| 3,093,564 | 6/1963 | Weisman et al. | 23—252 |
| 3,139,324 | 6/1964 | Housset | 23—2 |
| 3,149,907 | 9/1964 | Karwat | 23—2 |
| 3,159,548 | 12/1964 | Went | 176—37 |
| 3,177,631 | 4/1965 | Tamura | 55—79 |
| 3,203,866 | 8/1965 | Lehmer et al. | 176—37 |

FOREIGN PATENTS 955,345    4/1964    Great Britain.

L. DEWAYNE RUTLEDGE, *Primary Examiner.*

J. V. MAY, *Assistant Examiner.*